United States Patent
Pfeiffer

(10) Patent No.: US 6,594,056 B1
(45) Date of Patent: Jul. 15, 2003

(54) RECEIVER FOR USE IN A TRANSMISSION SYSTEM FOR SPECTRAL-CODED DATA AS WELL AS A METHOD

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/359,386

(22) Filed: Jul. 23, 1999

(30) Foreign Application Priority Data

Jul. 25, 1998 (DE) .......................... 198 33 549

(51) Int. Cl.[7] .......................... H04B 10/00; H04B 10/06
(52) U.S. Cl. .......................... 359/189; 359/195
(58) Field of Search .......................... 359/136, 193, 359/577–590, 189, 190, 192, 194, 195; 375/143

(56) References Cited

U.S. PATENT DOCUMENTS

| | | | | |
|---|---|---|---|---|
| 4,131,792 A | * | 12/1978 | Schlossberg | 356/484 |
| 4,644,145 A | * | 2/1987 | Gundner | 250/205 |
| 5,105,295 A | * | 4/1992 | O'Byrne | 359/191 |
| 5,144,467 A | * | 9/1992 | Kitajima et al. | 359/124 |
| 5,159,481 A | * | 10/1992 | Maeda | 359/189 |
| 5,301,053 A | * | 4/1994 | Shikada | 359/114 |
| 5,305,134 A | * | 4/1994 | Tsushima et al. | 359/124 |
| 5,654,814 A | * | 8/1997 | Ouchi et al. | 359/156 |
| H1702 H | * | 1/1998 | Esman et al. | 359/154 |
| 5,742,418 A | * | 4/1998 | Mizutani et al. | 359/156 |
| 6,043,922 A | * | 3/2000 | Koga et al. | 359/193 |
| 6,310,706 B1 | * | 10/2001 | Heidemann et al. | 359/125 |

FOREIGN PATENT DOCUMENTS

| | | |
|---|---|---|
| DE | 43 26 522 A1 | 2/1995 |
| EP | 0 595 140 A1 | 5/1994 |

* cited by examiner

Primary Examiner—Leslie Pascal
Assistant Examiner—Agustin Bello
(74) Attorney, Agent, or Firm—Sughrue Mion, PLLC

(57) ABSTRACT

A method for the reception of spectral-coded data, and a receiver, whereby an optical signal is decoded, converted into an electrical signal and amplified, and whereby the optical signal is modulated by the modulation of the synchronization of the optical filter in a first frequency, the modulated signal is converted in a light-sensitive detector into an electrical signal of a second frequency, and this electrical signal is transformed in a detector back into the base band.

20 Claims, 1 Drawing Sheet

RECEIVER FOR USE IN A TRANSMISSION SYSTEM FOR SPECTRAL-CODED DATA AS WELL AS A METHOD

BACKGROUND OF THE INVENTION

This application is based on and claims the benefit of German Patent Application No. 198 33 549.0 filed Jul. 25, 1998, which is incorporated by reference herein.

This invention relates to a receiver for use in a transmission system for spectral-coded data, and a method for reception of such spectrally coded data.

The prior art, such as Patent Application DE 197 23 103.9, for example, discloses transmission methods that employ spectral coding. Such a transmission network consists of optical transmission lines and optical splitters, as well as optical amplifiers if necessary, and is used for the transmission of coded, multiplexed optical signals. Each transmitter contains a coder in which the signals to be transmitted are coded before they are dispatched into the optical transmission network. The coding is done optically, e.g. by frequency coding using an optical filter. Each receiver that wants to receive the data from a special transmitter must contain a decoder that is synchronized to the encoder of this specific transmitter. In the simplest case, the frequency ranges that are permeable for optical signals and the frequency ranges that are blocked for optical signals are the same in the coder and in the decoder. This method is known by the term CDMA (Code Division Multiple Access). The senders used in this system can be light-emitting diodes, for example, the broad-band emission spectrum of which runs through an optical filter. The optical filter can be a Fabry-Perot filter, for example, that converts the broad-band spectrum in a frequency polarization comb assembly.

On the receiving side, Patent Application DE 19723103.9, for example, discloses a differential receiver. Such a receiver contains a decoder that is synchronized to the coder of the transmitter, the optical signals of which it wants to or is authorized to receive. In particular, the simultaneous activity of a plurality of transmitters in the optical transmission leads to side-to-side crosstalk in the receiver of the optical signals from the transmitters. The signals to be detected, therefore, also contain portions of optical signals from other transmitters which are experienced as interference. The prior art discloses ways to suppress this interference by compensation in the differential receiver. Such a receiver with compensation of the two signal branches is disclosed, for example, in Patent Application DE 19748756.4.

In the optical differential receiver for frequency-coded optical CDMA systems disclosed in this patent, it is necessary, within the electrical modulation bandwidth, e.g., 108 MHz for a n·155 MBit/s system, to guarantee the synchronization of the two receiver arms with regard to the amplitude and phase shifts of the signals of less than 0.1 dB and <10 ps for all frequencies. It is thereby possible to achieve a bit error rate of <$10^{-9}$, for example. The requirements for such an optical differential amplifier, however, increase with the number of simultaneous transmitters in the network, so that it becomes increasingly more difficult to connect much more than 8 transmitters to the network. For large numbers of transmitters, therefore, the concept of the differential receiver must be discarded. Nevertheless, the receiver claimed by the invention can be used to achieve the necessary suppression of the side-to-side crosstalk of the channels that are not to be received.

SUMMARY OF THE INVENTION

The receiver of the invention, an input signal can be evaluated that is modulated on the transmitter or receiver side by an impressed jitter of the carrier frequency of the frequency comb of by the jitter of the frequency intervals of the frequency comb.

In accordance with a further aspect of the invention, the filter characteristic of the at least one optical filter (3) can be modulated at a frequency $f_0$ and the electrical signal obtained by means of the light-sensitive detector (4) is applied to a microwave detector (6).

An advantage of this aspect of the invention over similar devices of the prior art is that a high number of transmitters can be operated in a transmission system. The sensitivity to crosstalk is largely eliminated by modulation of the optical signal.

It is advantageous if, in the receiver, a high suppression of the side-to-side crosstalk of the other channels is guaranteed by a modulation of the filter characteristic of the optical filter. The modulation of the optical filter is advantageously performed at a high frequency, and the modulated signal is evaluated with a microwave detector.

In one advantageous embodiment, the optical decoder is a Mach-Zehnder filter. Another embodiment uses a Fabry-Perot filter as the optical decoder. The optical filter is advantageously connected directly with a microwave generator. The modulation frequency is thereby always greater than the frequency of the bit rate of the data transmission.

Advantageous refinements and improvements of the receiver will be apparent from the detailed description below and the appended claims.

In accordance with a further aspect of the invention, a method for the reception of spectral-coded optical signals in a CDMA transmission system is provided whereby an optical signal is decoded, converted into an electrical signal and amplified, wherein the optical signal is modulated by modulation of the synchronization of the optical decoder at a first frequency, the modulated signal is converted in a light-sensitive detector into an electrical signal of a second frequency, and this electrical signal is transformed back into the base band in a detector.

In accordance with a yet further aspect of the invention, a method for the reception of spectral-coded optical signals in a CDMA transmission system is provided wherein an optical signal is decoded, converted into an electrical signal and amplified, wherein the optical signal is modulated by modulation in the transmitter, the modulated signal is converted in a light-sensitive detector into an electrical signal of a second frequency, and this electrical signal is transformed back into the base band in a detector.

BRIEF DESCRIPTION OF THE DRAWING

One exemplary embodiment of the invention is illustrated in the accompanying drawing and is explained in greater detail below. In the drawing.

DETAILED DESCRIPTION OF THE INVENTION

Figure 1:
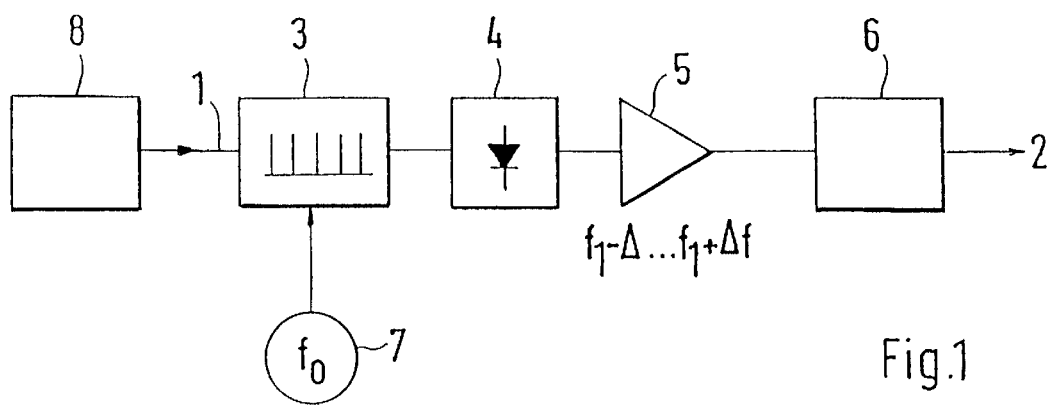
FIG. 1 is a schematic diagram of a receiver according to the invention.
Figure 2:
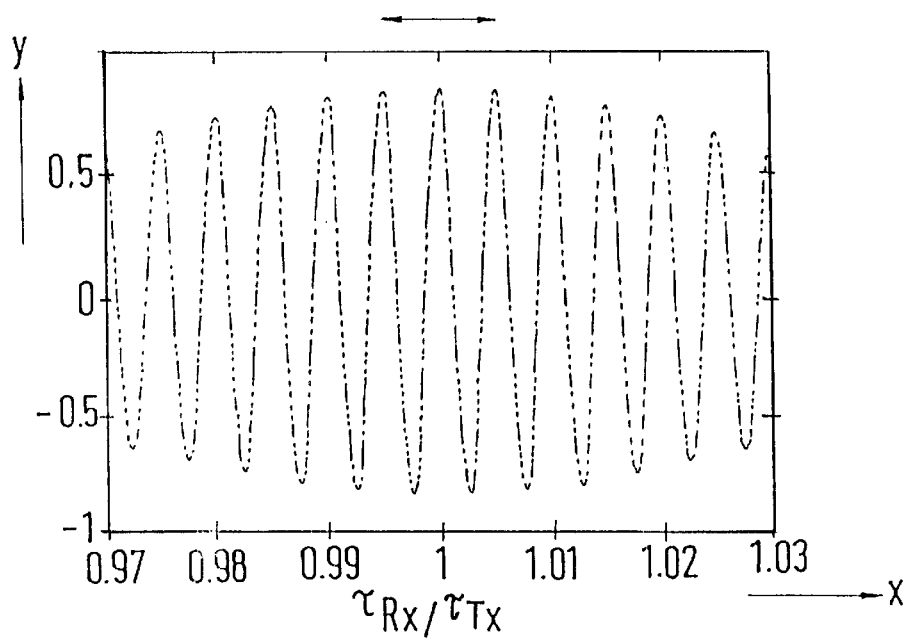
FIG. 2 illustrates the synchronization curve of the optical filter in FIG. 1.

In FIG. 1, the signal input (1) is connected with an optical filter (3), which is in turn connected to a microwave oscillator (7). The optical output of the optical filter (3) is connected with the input of a photodetector (4), the output of which is connected to an amplifier (5). The output signal of the amplifier is transmitted to a microwave detector (6), at which the electrical output data (2) are once again available. FIG. 2 shows a detail from the synchronization curve of the optical filter (3). Plotted along the x-axis is the normalized inverse FSR (Free Spectral Range) of the receiver filter, and the y-axis represents the optical output power of the optical filter (3). By means of the microwave oscillator (7), the free spectral range (FSR) of the optical filter (3) at a frequency $f_0$ is modulated by a few fractions, for example $10^{-5}$. The modulation of the optical filter (3) can thereby be performed, for example, by means of an optical phase modulator. The modulation frequency $f_0$ must therefore be greater than the bit rate $f_{data}$ of the data to be detected. The shift is large enough that is runs through at least one maximum and one minimum of the synchronization curve of the optical filter (3). The output signal to the photo diode (5) is then amplitude-modulated at a frequency $f_1 > f_0$, whereby contributions from upper harmonics are ignored. The exact value of $f_1$ depends on the shift of the FSR modulation, and can be set using the latter. The frequency subcarrier at $f_1$ is still modulated with the data signals, so that a narrow band amplifier with a bandwidth of $2*\Delta f$ around a central frequency of $f_1$ is required for the electrical amplification. For example, $\Delta f = 0.7*f_{data}$ is sufficient as the bandwidth for the amplifier. The retransformation of the subcarrier signal into the base band is done, for example, using a microwave detector. The transmitters to be suppressed, which are received in the form of crosstalk between channels in the receivers, do not make any contribution, because for it the corresponding synchronization curve is a constant, i.e., it does not depend on the precision adjustment of the free spectral range of the optical filter (3), and therefore does not generate any microwave signal in the photo diode, either.

These same advantages can be achieved by influencing the optical signal on the transmission side so that the transmitted frequency comb is subjected to a jitter. It is thereby possible, as described in Patent Application DE 19822616.0, to influence the optical transmission signal and to evaluate the electrical signal on the receiver side by the use of the microwave detector. The jitter can thereby be created on the transmitter (8) side by modulation of the carrier frequency of the frequency comb, or by a modulation of the FSR of the transmitter filter.

The same advantages can be achieved by shifting the receiving spectrum to the transmitter side instead of the FSR of the optical filter. All the variants with an imposed optical jitter must be realized at a frequency $f_0$ that is greater than the bit rate $f_{data}$.

As to the microwave detector, an envelope curve detector can be used on the receiver side, although it is also possible to perform an evaluation by means of a coherent heterodyning.

What is claimed is:

1. A receiver for a transmission system for spectral-coded data comprising:
   a periodic optical comb filter,
   a light-sensitive detector coupled to the periodic optical filter; and
   an electrical signal amplifier coupled to the light-sensitive detector, wherein an input signal is modulated by at least one of an impressed jitter of a carrier frequency of a frequency comb or by the jitter of the frequency intervals of the frequency comb.

2. A receiver as claimed in claim 1, wherein the optical filter is a Mach-Zehnder filter.

3. A receiver as claimed in claim 1, wherein the optical filter is a Fabry-Perot filter.

4. A receiver as claimed in claim 1, wherein the optical filter is connected to a microwave generator.

5. A receiver as claimed in claim 1, wherein a modulation frequency applied to the periodic optical comb filter is greater than a bit rate frequency of a data transmission.

6. A receiver as claimed in claim 1, wherein a modulation frequency applied to the periodic optical comb filter causes a modulation shift that runs through a maximum and a minimum of a synchronization curve of the optical filter.

7. The receiver as claimed in claim 1, further comprising a microwave detector, coupled to an output of the electrical signal amplifier, to convert an output signal of the electrical signal amplifier into a baseband signal.

8. The receiver as claimed in claim 7, wherein the microwave detector is an envelope curve detector.

9. A receiver for a transmission system for spectral-coded data comprising:
   a periodic optical comb filter,
   a light-sensitive detector coupled to the periodic optical filter, and
   an electrical signal amplifier coupled to the light-sensitive detector, wherein the filter characteristic of the periodic optical filter can be modulated at a frequency f0, wherein an input signal is modulated by at least one of an impressed jitter of a carrier frequency of a frequency comb or by the jitter of the frequency intervals of the frequency comb.

10. The receiver as claimed in claim 9, wherein the modulation frequency f0 is greater than a bit rate frequency of a data transmission.

11. The receiver as claimed in claim 9, wherein the modulation frequency f0 causes a modulation shift that runs through a maximum and a minimum of a synchronization curve of the optical filter.

12. The receiver as claimed in claim 9, further comprising a microwave detector, coupled to an output of the electrical signal amplifier, to convert an output signal of the electrical signal amplifier into a baseband signal.

13. The receiver as claimed in claim 12, wherein the microwave detector is an envelope curve detector.

14. The receiver as claimed in claim 9, wherein the electrical signal amplifier amplitude modulates an output signal of the light-sensitive detector at a frequency f1 that is greater than the frequency f0.

15. The receiver as claimed in claim 14, wherein the electrical signal amplifier has a bandwidth of $2*\Delta f$ centered around the frequency f1, where $\Delta f$ represents half the bandwidth.

16. The receiver as claimed in claim 15, wherein $\Delta f$ is approximately equal to $0.7*$ fdata, where fdata represents the data bit rate.

17. The receiver as claimed in claim 9, wherein the light-sensitive detector is a photodiode.

18. A method for the reception of spectral-coded optical signals in a CDMA transmission system, said method comprising:
   modulating the optical signal by modulation of the synchronization curve of a periodic optical comb filter at a first frequency, converting the modulated signal in a light-sensitive detector into an electrical signal of a second frequency, and transforming said electrical signal back into a base band signal in a detector.

19. The method as claimed in claim 18, wherein the electrical signal is electrically amplified before transformation back into the base band signal.

20. A method for the reception of spectral-coded optical signals in a CDMA transmission system, said method comprising:

modulating the optical signal in a transmitter at a first frequency, passing the modulated optical signal through a periodic optical comb filter, converting the modulated signal in a light-sensitive detector into an electrical signal of a second frequency, and transforming said electrical signal back into a base band signal in a detector.

* * * * *